US006968713B2

(12) United States Patent  (10) Patent No.: US 6,968,713 B2
Corrigan  (45) Date of Patent: Nov. 29, 2005

(54) DESICCANT CUP WITH INTEGRAL FILTER

(75) Inventor: Daniel Leonard Corrigan, Belleville (CA)

(73) Assignee: Halla Climate Control Canada, Inc., Belleville (CA)

( * ) Notice: Subject to any disclaimer, the term of this patent is extended or adjusted under 35 U.S.C. 154(b) by 0 days.

(21) Appl. No.: 10/799,176

(22) Filed: Mar. 12, 2004

(65) Prior Publication Data

US 2005/0198993 A1  Sep. 15, 2005

(51) Int. Cl.[7] .......................................... F25B 43/00
(52) U.S. Cl. ........................................ 62/474; 62/512
(58) Field of Search .................. 62/747, 471, 475, 62/503, 509, 512; 55/516, 517, 518, 519; 96/134, 135, 137, 149, 153

(56) References Cited

U.S. PATENT DOCUMENTS

| | | | |
|---|---|---|---|
| 3,266,628 A | 8/1966 | Price | 210/94 |
| 3,680,707 A | 8/1972 | Zeek | 210/266 |
| 3,708,965 A * | 1/1973 | Domnick | 55/488 |
| 3,799,352 A | 3/1974 | McClive | 210/282 |
| 3,879,292 A | 4/1975 | McClive | 210/282 |
| 3,938,351 A * | 2/1976 | Schumacher | 62/217 |
| 4,093,105 A | 6/1978 | Russell et al. | 220/373 |
| 4,231,486 A | 11/1980 | Bock | 220/266 |
| 4,353,472 A | 10/1982 | Burton et al. | 215/211 |
| 4,457,843 A | 7/1984 | Cullen et al. | 210/282 |
| 4,506,523 A * | 3/1985 | DiCarlo et al. | 62/470 |
| 4,673,420 A | 6/1987 | Haker et al. | 55/179 |
| 4,768,355 A * | 9/1988 | Breuhan et al. | 62/503 |
| 4,865,637 A | 9/1989 | Gruber | 55/502 |
| 5,179,844 A * | 1/1993 | Lyman et al. | 62/503 |
| 5,240,483 A * | 8/1993 | Rosen | 96/137 |
| 5,364,540 A * | 11/1994 | Sciuto | 210/806 |
| 5,435,153 A | 7/1995 | Hutchison et al. | 62/474 |
| 5,503,662 A | 4/1996 | Berger | 96/108 |
| 5,529,203 A * | 6/1996 | Flaugher | 220/787 |
| 5,540,348 A | 7/1996 | Wood | 220/306 |
| 5,569,316 A | 10/1996 | Flaugher et al. | 96/135 |
| 5,580,451 A | 12/1996 | Tack | 210/266 |
| 5,641,088 A | 6/1997 | Berger | 220/613 |
| 5,673,493 A | 10/1997 | Kazakis et al. | 34/80 |
| 5,685,087 A | 11/1997 | Flaugher et al. | 34/80 |
| 5,689,893 A | 11/1997 | Mitsch | 34/80 |
| 5,697,602 A * | 12/1997 | Guerra Cisneros et al. | 220/328 |
| 5,716,432 A | 2/1998 | Perrine | 96/135 |
| 5,718,743 A | 2/1998 | Donnelly et al. | 96/135 |
| 5,730,785 A | 3/1998 | Idol et al. | 96/108 |
| 5,814,136 A | 9/1998 | Wood | 96/147 |
| 5,816,438 A | 10/1998 | Berger | 220/613 |
| 5,824,140 A | 10/1998 | Berger | 96/108 |
| 5,833,784 A | 11/1998 | Berger | 156/69 |
| 5,942,060 A | 8/1999 | Berger | 156/69 |
| 5,966,810 A * | 10/1999 | Chisnell et al. | 29/890.06 |
| 6,044,649 A * | 4/2000 | Numoto et al. | 62/114 |

(Continued)

FOREIGN PATENT DOCUMENTS

DE     3815937 A  * 11/1989

(Continued)

Primary Examiner—Mohammad M. Ali
(74) Attorney, Agent, or Firm—Baker & Daniels LLP

(57) ABSTRACT

A desiccant container for use in an accumulator or a receiver/dryer of a vehicle includes at least one integral mesh screen for preventing small particles from passing therethrough. Preferably, the container includes two integral mesh screens, one forming an upper surface of the desiccant container and the other forming a lower surface of the desiccant container. By incorporating integral mesh screens, the container need not include separate filters.

16 Claims, 10 Drawing Sheets

U.S. PATENT DOCUMENTS 6,190,440 B1    2/2001   Purnell ........................ 96/108
6,223,555 B1 *  5/2001   Schroeder et al. ............ 62/503
6,309,450 B1 * 10/2001   Millen et al. ................. 96/131

FOREIGN PATENT DOCUMENTS

JP            06099003 A  *  4/1994

* cited by examiner

DESICCANT CUP WITH INTEGRAL FILTER

FIELD OF THE INVENTION

The invention relates to containers for desiccants and is particularly concerned with desiccant containers used within heating, ventilation and air conditioning (HVAC) systems.

BACKGROUND OF THE INVENTION

The invention relates to desiccant containers for any purpose. However, specific embodiments will be described with respect to desiccant containers within HVAC systems.

A typical vehicle air conditioning system, for example, incorporates a compressor, a condenser, an expansion device, an evaporator and a refrigerant storage device. The compressor compresses refrigerant. The refrigerant flows to the condenser, where it changes state from gas to liquid. In a system with a thermal expansion valve (a "TXV system"), refrigerant then passes into a refrigerant storage device called a receiver/dryer (R/D) before passing to the expansion device. In a system with a fixed orifice tube (an "FOT system"), refrigerant then passes directly from the condenser to the expansion device. The expansion device is used to significantly lower the pressure and temperature of the refrigerant before it passes to the evaporator. After the expansion device, the liquid refrigerant then flows to the evaporator. At that stage, an air blower passes air over the evaporator to the passenger compartment of the vehicle, thereby cooling the air within the vehicle. The heat transfer from the ambient air to the evaporator causes most of the refrigerant to change from a liquid to a gas.

In an FOT system, the refrigerant (now mostly gas and some liquid) flows from the evaporator to a refrigerant storage device called an accumulator. (In a TXV system, the refrigerant flows from the evaporator to the compressor directly.)

One purpose of the accumulator is to separate liquid refrigerant from gaseous refrigerant, so that only gaseous refrigerant returns to the compressor. Liquid refrigerant entering the compressor causes "flooding" which in turn reduces system efficiency and can damage the compressor. Hence it is standard practice to include an accumulator between the evaporator and the compressor to separate and store the excess or residual liquid. The residual liquid refrigerant in the accumulator eventually turns to a gaseous state and is then passed to the compressor.

Accumulators and receivers/dryers often incorporate a desiccant to prevent (or at least limit) moisture ingression in the compressor and the resulting damage or loss of efficiency to the air conditioning system. (For simplicity, hereinafter, the term "accumulator" or "refrigerant storage device" will refer to both accumulators and receiver/dryers.)

Particulate desiccants are often used in such systems because of the high area-to-volume ratios of the particles with respect to the surrounding air or fluid. Because the desiccant particles must be held in the air or fluid stream and prevented from contaminating other parts of the air conditioning system, the particles must be held in a container which is permeable to the air or fluid but impermeable to the particles.

In some known cases, loose desiccant is contained within a bag, the bag being constrained between filters. The filters are often discs made of felt, gauze, fiber or plastic (fused). Such bags are problematic because they can be easily damaged during assembly and/or testing. A tear in the bag allows the loose desiccant particles to escape and potentially enter the air-conditioning system, where they can damage the accumulator and other components.

In certain other systems, it is known to confine the desiccant within a hard container. In those cases, filter discs, such as those described above, are typically placed in the top and bottom of the desiccant container during manufacturing. However, there are certain drawbacks associated with the use of such filter discs. For example, the materials used within the filter discs, such as polyester or polypropylene matted or needles felt, for example, have been known to stimulate a reaction with the air conditioning refrigerant R-134A to create a significant noise within the air conditioning system. It would be desirable to eliminate the noise. It would also be desirable to eliminate the cost associated with the purchase of the filter discs. It would also be desirable to eliminate the time and cost associated with their installation within the desiccant cup. It would also be desirable to eliminate filter discs because they deteriorate during service and release high aspect ratio fibres into the air conditioning system.

A number of desiccant cups are known which have a one-piece cup with a one-piece cap, such as that taught in U.S. Pat. No. 5,522,204 in the name of Wood. The cup taught in Wood incorporates holes formed within the cap and cup bottom. However, such cups require additional filter layers placed against the cap and cup bottom. As well, holes formed within the cap and cup bottom in this manner have a number of drawbacks. One drawback is that diameter of the holes is large enough to allow desiccant particles to pass through or become caught or blocked in the holes. Therefore, such cups require a separate filter. As well, it would be desirable to have a more open area for fluid to pass through than is permitted through an array of holes, such as taught in Wood, because more open area reduces pressure drop in the system, thereby increasing efficiency.

SUMMARY OF THE INVENTION

According to a first aspect, the invention provides a desiccant container for use in a refrigerant storage device of a vehicle, the container comprising a lid comprising an inner boundary defining a first aperture, an outer boundary surrounding the inner boundary, and an integral first mesh screen extending between the inner boundary and the outer boundary, wherein the first mesh screen is adapted to prevent small particles from passing therethrough; a body comprising an inner wall defining a second aperture, an outer wall surrounding the inner wall, and an integral second mesh screen extending between the inner wall and the outer wall, wherein the second mesh screen is adapted to prevent small particles from passing therethrough; wherein the lid and the body are adapted to fit together to create an enclosed cavity, and to prevent small particles from passing between an edge of the lid and the body, and when the lid and the body are together, the first aperture and the second aperture are aligned.

According to another aspect, the invention provides a desiccant container for use in a refrigerant storage device of a vehicle, the container comprising at least one integral mesh screen, each mesh screen preventing small particles from passing therethrough.

According to yet another aspect, the invention provides a refrigerant storage device for a vehicle, the refrigerant storage device comprising a desiccant container wherein the container comprises at least one integral mesh screen, each mesh screen preventing small particles from passing therethrough.

Advantageously, different embodiments of the present invention may permit: the elimination of noise created in the air conditioning system when polyester, polypropylene matted, other matted synthetic fibre, cotton fibre, low permeation or needled felt are used as filters; the reduction of cost by eliminating the need to purchase separate filters for the desiccant container; the reduction of time and cost relating to the labour required to install separate filters for the desiccant container; a desiccant container incorporating integral filtration with significant open area, thereby reducing pressure drop (as compared to a container with less open area); the provision of a filter for 100% of the liquid above the oil bleed hole of the accumulator, which provides a significant advantage since a typical oil bleed filter (located in or near the oil bleed aperture) is small in size and can become partially or completely blocked with a relatively small amount of contamination (thereby disrupting oil flow); and increasing the efficiency of the air conditioning system.

BRIEF DESCRIPTION OF THE DRAWINGS

Preferred embodiments of the invention will now be described with reference to the attached drawings in which

FIG. 2b is a perspective view of a lid of the desiccant container of FIG. 2a;

FIG. 2d is a perspective view looking down on the body of the desiccant container of FIG. 2a;

DETAILED DESCRIPTION

Figure 1:
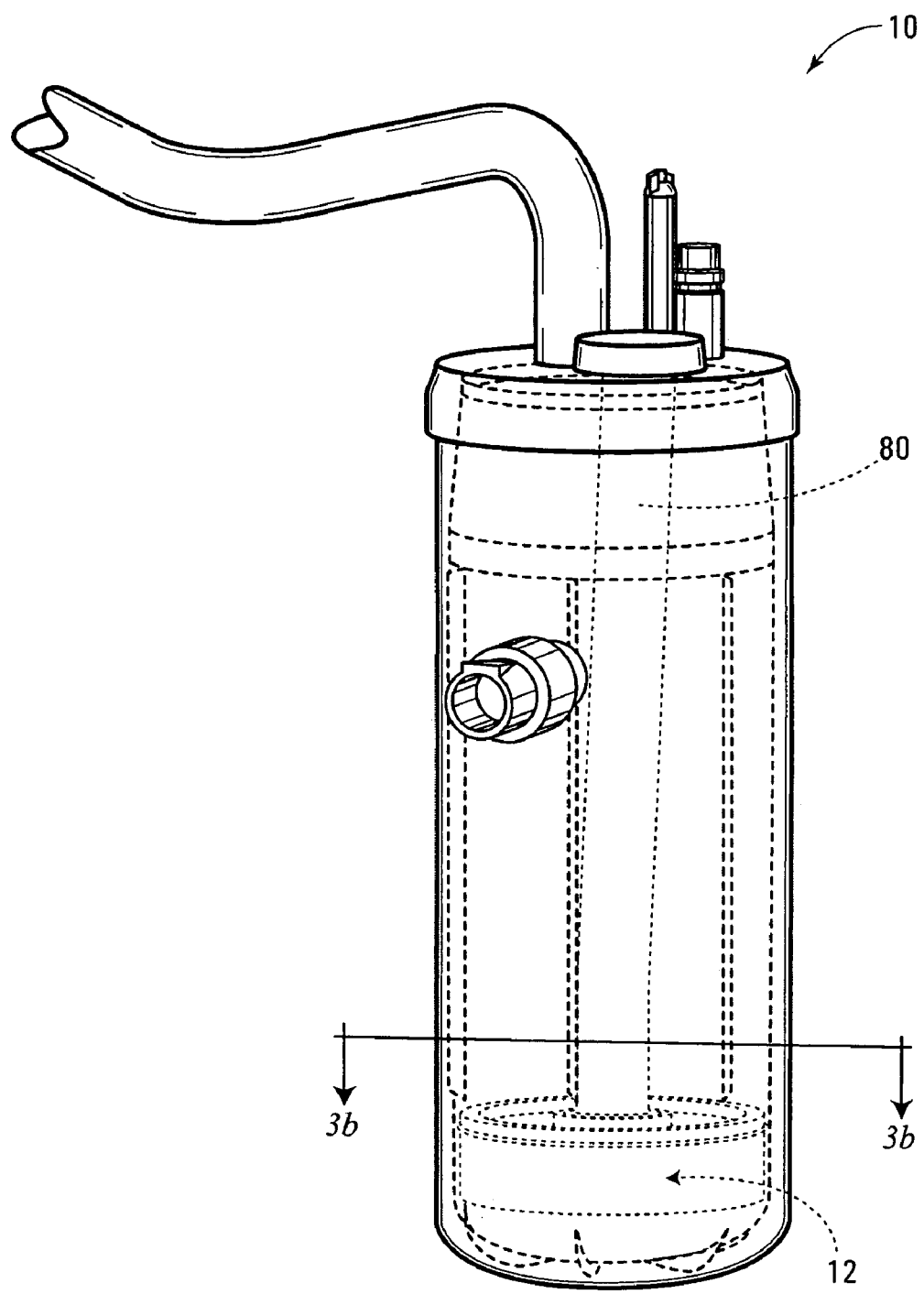
FIG. 1 is a side view of a representative accumulator, with certain features inside the accumulator, including a desiccant container, shown by dotted outline in accordance with an aspect of the present invention.

FIG. 1 shows a representative accumulator or refrigerant storage device 10 for an air conditioning (or heating, ventilation and air conditioning (HVAC)) system of a vehicle. The accumulator 10 as shown in FIG. 1 has certain features omitted for simplicity and certain features inside the accumulator 10 are shown by dotted outline. A desiccant container 12 according to an aspect of the present invention is shown roughly in position within the accumulator 12, for example purposes.

Figure 2A:
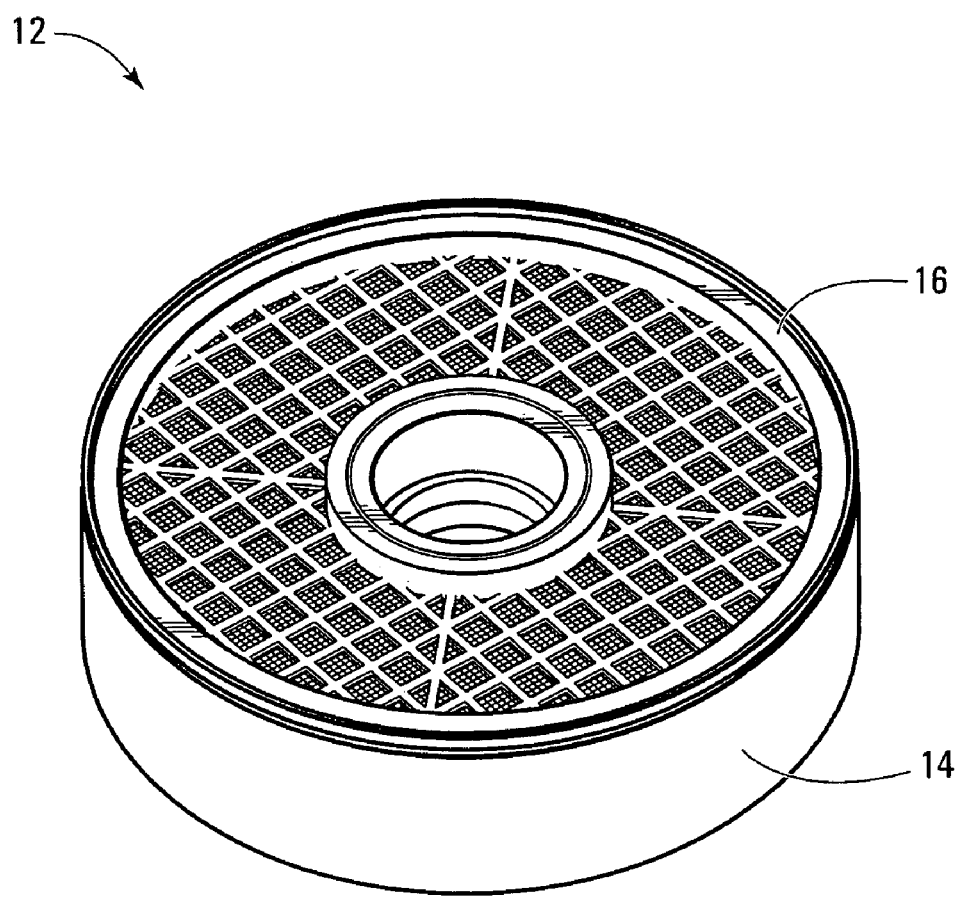
FIG. 2a is a perspective view of a desiccant container in accordance with an aspect of the present invention.
Figure 2B:
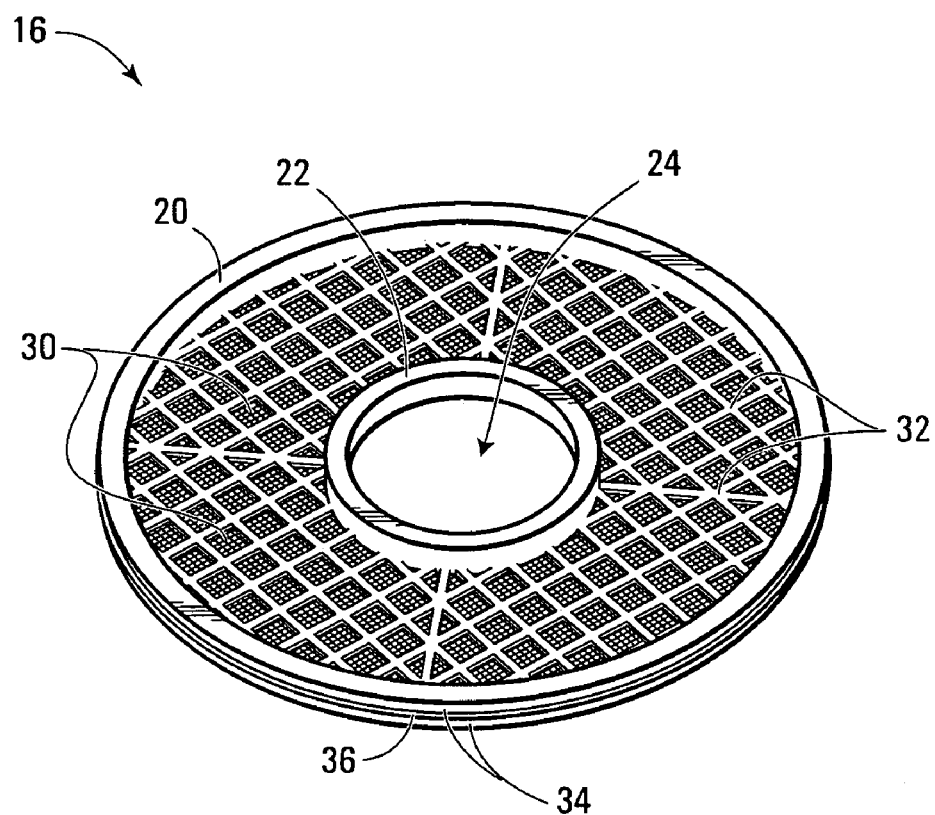

FIG. 2a is a perspective view of the desiccant container 12. The desiccant container 12 has two portions, namely an open body or cup portion 14 and a lid 16. FIG. 2b is a perspective view of the lid 16. FIG. 2d is a perspective view of the open cup 14.

As perhaps best seen in FIG. 2b, the lid 16 is a one-piece casting. The lid 16 is a generally circular, one-piece casting, having a generally circular outer or peripheral boundary 20 and a concentric, generally circular, inner boundary 22, forming an opening 24 therein. Between the peripheral boundary 20 and the inner boundary 22 is an integrally molded mesh screen 30, advantageously supported and strengthened by an integrally molded, lattice support structure 32. Preferably, the mesh screen 30 has a low profile. As shown in FIG. 2b, the profile of the inner boundary 22 and the profile of the peripheral boundary 20 may be higher than the profile of the mesh screen 30. Similarly, the profile of the support structure 32 may be higher than the profile of the mesh screen 30.

Figure 2C:
FIG. 2c is a side view of the lid of FIG. 2b.
Figure 2D:
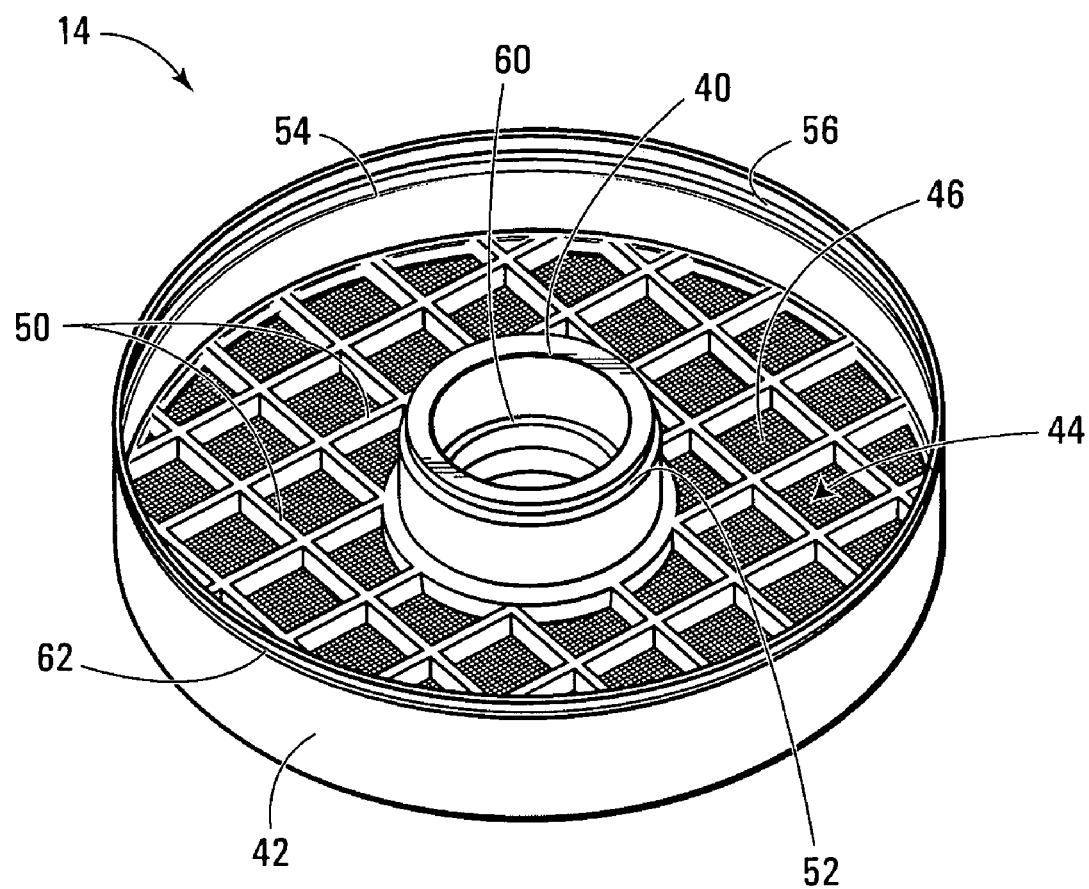

As shown in FIGS. 2b and 2c, an outer surface 34 of the peripheral boundary 20 advantageously has an integral bead 36 or series of beads extending outwardly therefrom.

As perhaps best seen in FIG. 2d, the cup 14 is a one-piece casting. The cup 14 incorporates a generally cylindrical inner wall 40, and a concentric, generally cylindrical outer wall 42. The inner wall 40 and the outer wall 42 are joined by an integrally molded bottom portion 44 extending between the inner wall 40 and the outer wall 42 and connecting with the inner and outer walls 40, 42 at or near their bases. The bottom portion 44 comprises a mesh screen 46 supported and strengthened by an integrally molded, lattice support structure or grid 50. Advantageously, the mesh screen 46 has a low profile. As shown in FIG. 2d, the profile of the support structure 50 may be higher than the profile of the mesh screen 46. The support structure 50 also acts as a gating system for the injection molding process.

The support structure 50 for the mesh screen 46 of the cup 14 may be deeper and/or wider than the support structure 32 of the mesh screen 30 of the lid 16. The support structure 32 in the lid 16 may be less deep and less wide to reduce the weight of the lid and to reduce the height of the lid. The precise geometry, configuration, and size of the support structures 32 and 50 may be varied. Although the support structures 32 and 50 could be omitted, they do provide certain advantages. Among other advantages, the support structures 32 and 50 help maintain a resistance to distortion during the molding process and they provide support for the finished product.

The bottom portion 44 of the cup 14 and the lid 16 each have an open area of approximately 30%. However, this percentage could vary depending upon many factors, including the size of the mesh screen openings 30 and 46, as well as the strength and configuration of the support structures 32 and 50, for example. The openings within the mesh screens 30 and 46 are sized to restrict the passage of desiccant particles and other particles that may be detrimental to the air conditioning compressor. Ideally, the openings within the mesh screens 30 and 46 are smaller than about 350 microns, and advantageously smaller than about 300 microns.

According to one embodiment, the outer surface of the inner wall 40 of the cup 14 has an outwardly extending support rib 52 and the outer wall 42 has a corresponding, inwardly extending support rib 54. Just above the support rib 54 on the inner surface of the outer wall 42, is a groove 56.

Figure 2E:
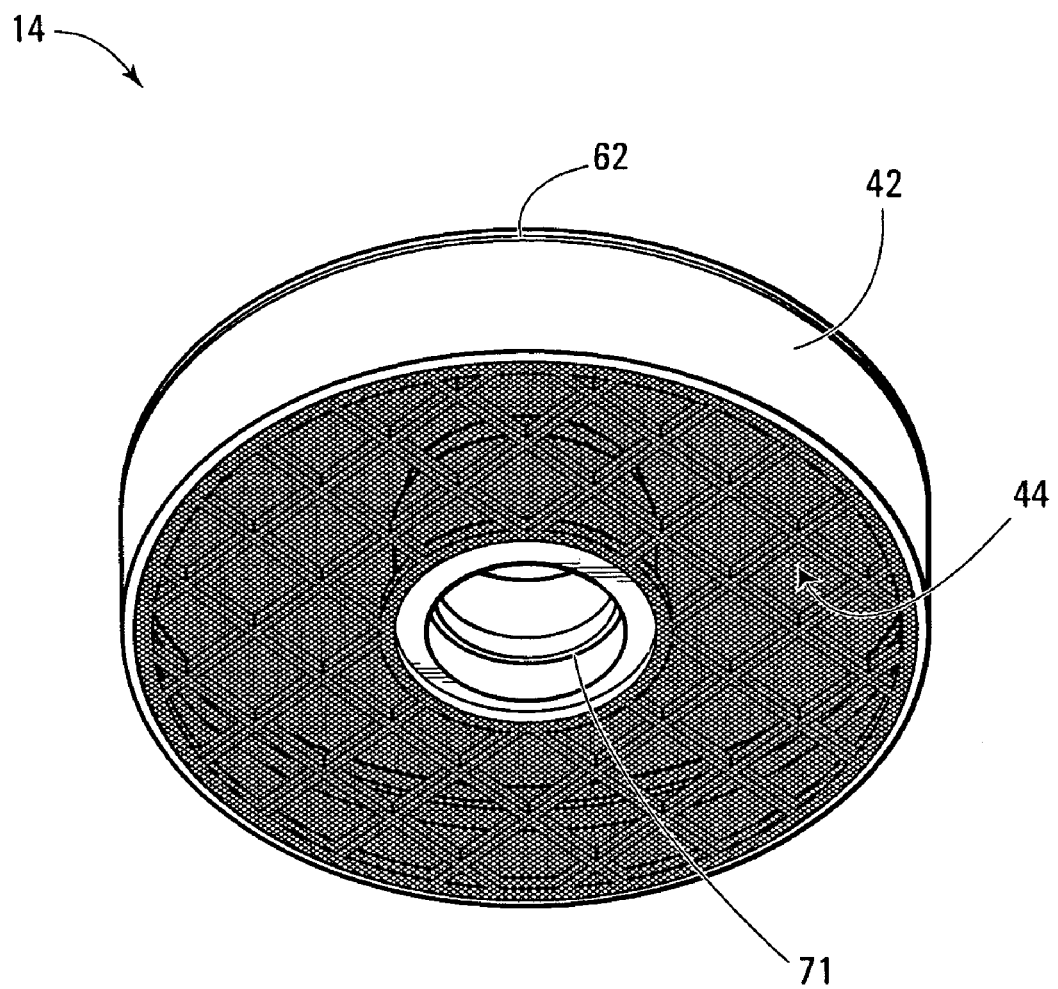
FIG. 2e is a perspective view looking up at the body of the desiccant container of FIG. 2d.
Figure 2F:
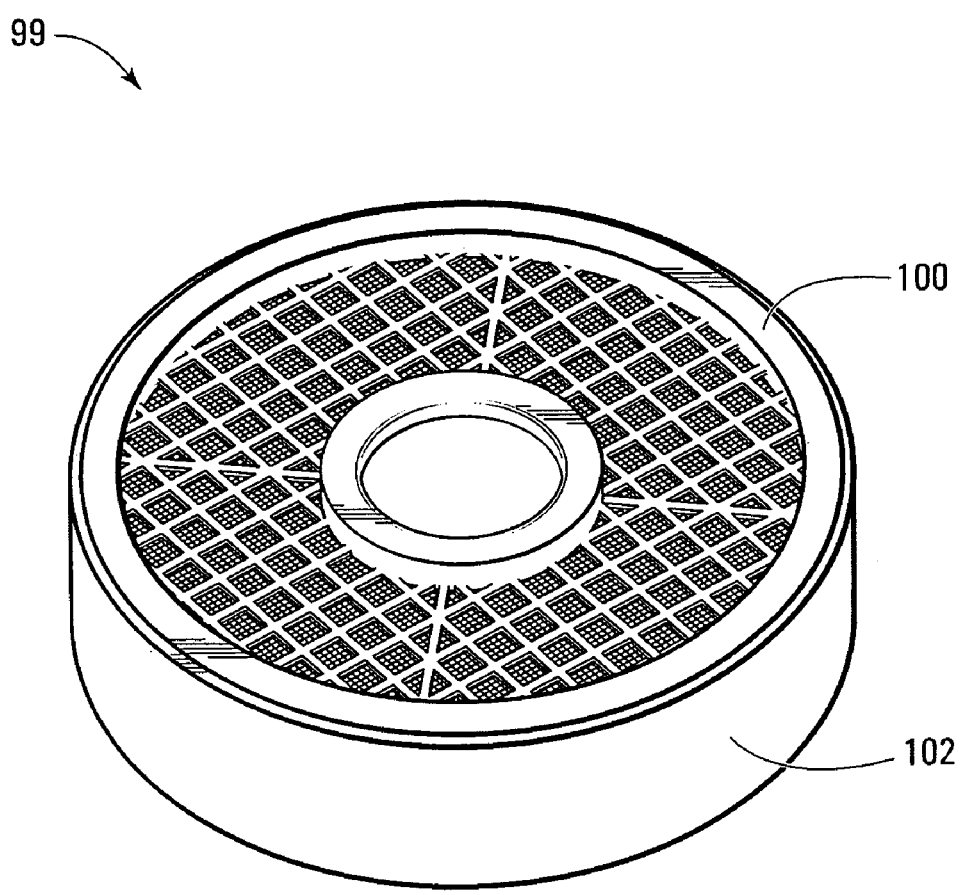
FIG. 2f is a perspective view of an alternate embodiment of a desiccant container.
Figure 2G:
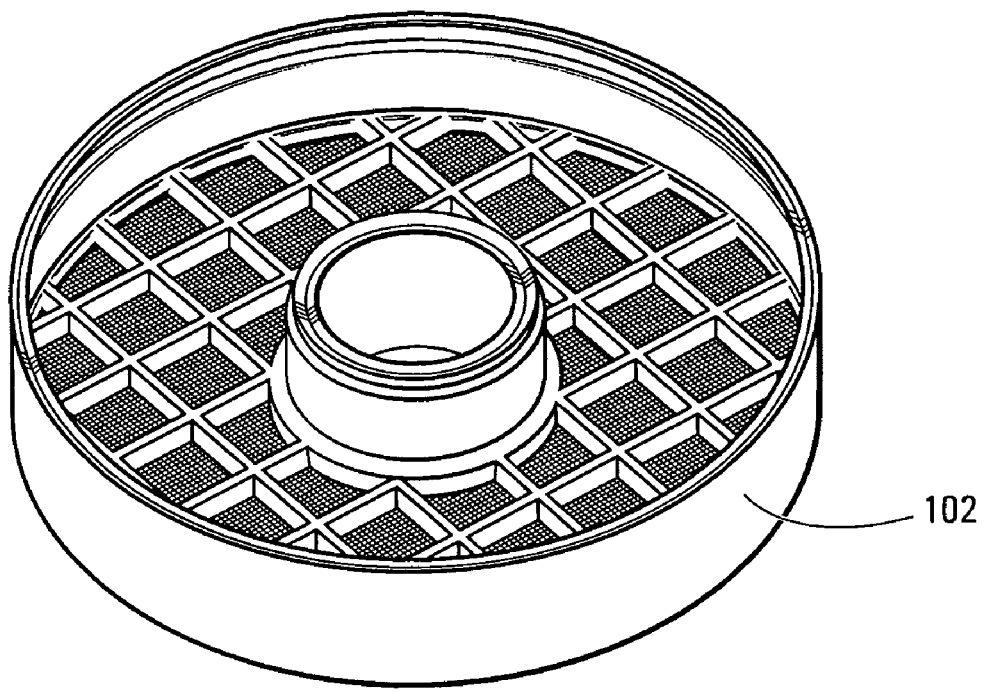
FIG. 2g is a perspective view of a desiccant cup of the desiccant container of FIG. 2f.
Figure 2H:
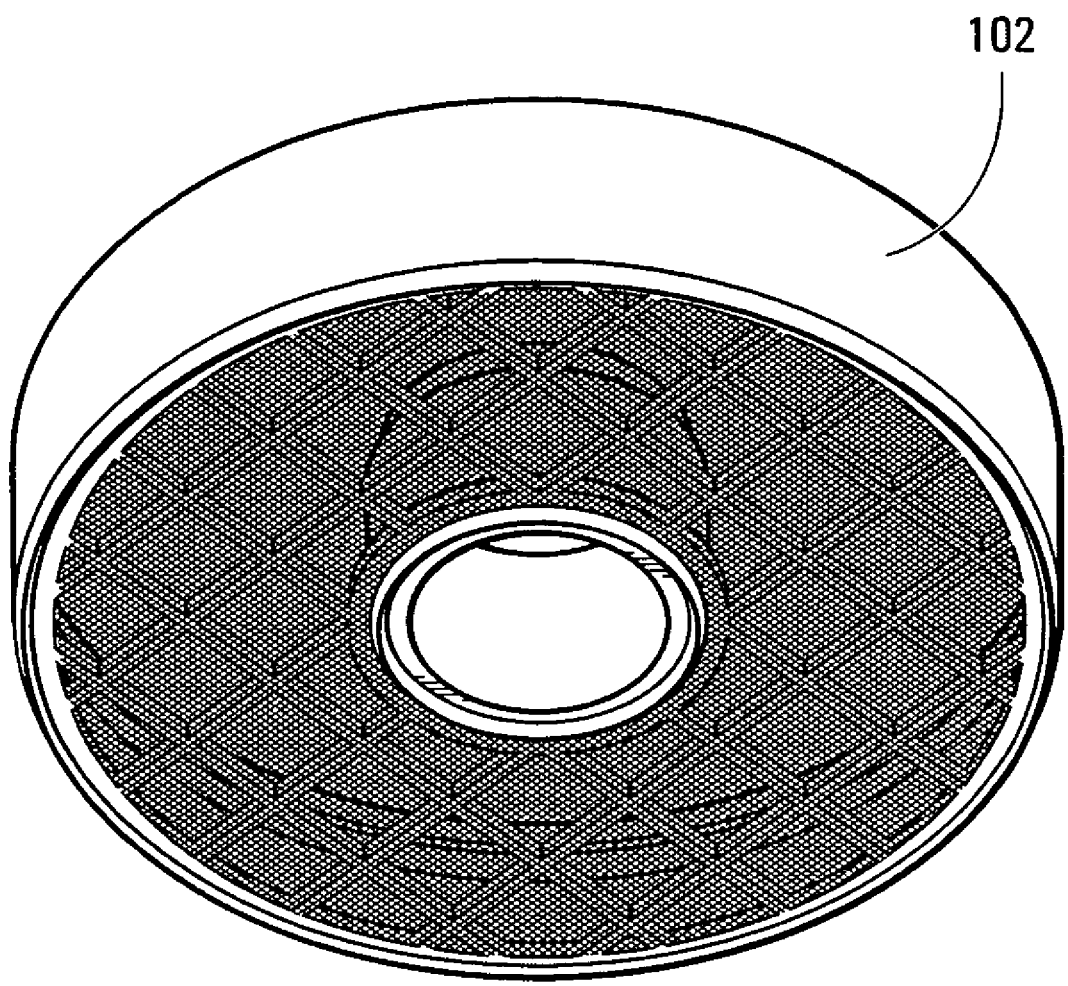
FIG. 2h is a perspective view of the desiccant cup of FIG. 2g, looking up.

The inner surface of the inner wall 40 of the cup 14 has an inwardly extending outlet tube stop or support rib 60. As well, as shown in FIG. 2e, the inner surface of the inner wall 40 of the cup 14, below the outlet tube stop 60, has an inwardly extending step or liner support rib 71, for supporting the cup 14 on the liner 70, as described below.

Advantageously, on the outer surface of the outer wall 42 of the cup 14, just below the top edge of the outer wall 42 is an outwardly extending bead 62. Alternatively, the bead 62 could instead be a series of beads 62 (not shown).

In order to use the desiccant cup within the accumulator 10, loose desiccant (not shown) is placed in the cup 14. The lid 16 is then placed within the cup 14. When the lid 16 is lowered within the cup 14, the inner boundary 22 of the lid rests against a top surface of the support rib 52 of the inner wall 40, and the peripheral boundary 20 of the lid 16 rests against a top surface of the support rib 54 of the outer wall 42 of the cup 14. As well, the bead 36 on the outer surface 34 of the lid 16 snaps within the groove 56 of the outer wall 42 of the cup 14 to secure the lid 16 in place.

The lid 16 may be further secured to the cup 14 through a number of techniques known to those skilled in the art. One such technique is ultra-sonic welding. One weld (not shown) attaches the inner surface of the inner boundary 22 of the lid 16 to the outer surface of the inner wall 40 of the cup 14. Another weld attaches the outer surface 34 of the lid 16 to the inner surface of the inner wall 40 of the cup 14.

When the desiccant cup 14 has been filled with desiccant, such as synthetic zeolite or sol-gel silica, for example, and after the lid 16 has been secured to the cup 14, the cup may be placed within the accumulator 10. The particular configuration of the desiccant cup 14 and lid 16 described above may be accommodated by the accumulator 10 of the type shown in FIG. 3. As shown in FIG. 3, the accumulator 10 has an inner liner 72, which fits within the accumulator 10. The liner 72 incorporates a central support (not shown) for the cup 14, which support terminates in an upwardly extending, open, generally circular terminal portion, forming a hole within the terminal portion. The terminal portion of the liner 72 has a diameter sufficient to support the bottom surface of the liner support rib 71 of the inner wall 40 of the cup 14. The liner 72 may also incorporate a groove 74 in its inside surface.

The desiccant cup 14 is placed on top of the terminal portion of the liner 72. In that position, the bead 62 on the exterior surface of the outer wall 42 of the cup 14 snaps into the groove 74 on the inside surface of the liner 72, to help secure the cup 14 in position and to prevent passage of particles between the outer wall 42 of the cup 14 and the inside surface of the liner 72.

When the cup 14 is in position within the liner 70, an outlet tube 80 is placed inside the inner wall 40 of the cup 14, the outlet tube being supported by the upper surface of the outlet tube stop 60.

Preferably, the elements of the liner 72, the cup 14 and the lid 16 are adapted to fit together so that particles larger than 350 microns cannot pass from above the lid 16 to below the cup 14.

The cup 14 and the lid 16 could be manufactured from any number of materials known to those skilled in the art including nylon, polyester, and polypropylene materials suitable for use in environments where refrigerant and oil are present. As suggested above, the cup 14 and the lid 16 may be formed by injection molding.

Numerous modifications and variations of the present invention are possible in light of the above teachings. It is therefore to be understood that within the scope of the appended claims, the invention may be practised otherwise than as specifically described herein.

Of course, there are many other possible configurations to allow a lid and a cup for a desiccant to fit together. There are also many different configurations to allow a desiccant container to fit within an accumulator or receiver/dryer. One example of a configuration different from those described above is shown in the alternate embodiment of FIGS. 2f, 2g, 2h and 3b.

In the earlier embodiment shown in FIG. 2a, the lid 16 fits within the circumference of the cup 14. However, as shown in the alternate embodiment of a desiccant container 99 of FIGS. 2f and 3b, the circumference of a lid 100 rests on top of the circumference of a cup 102.

Figure 3A:
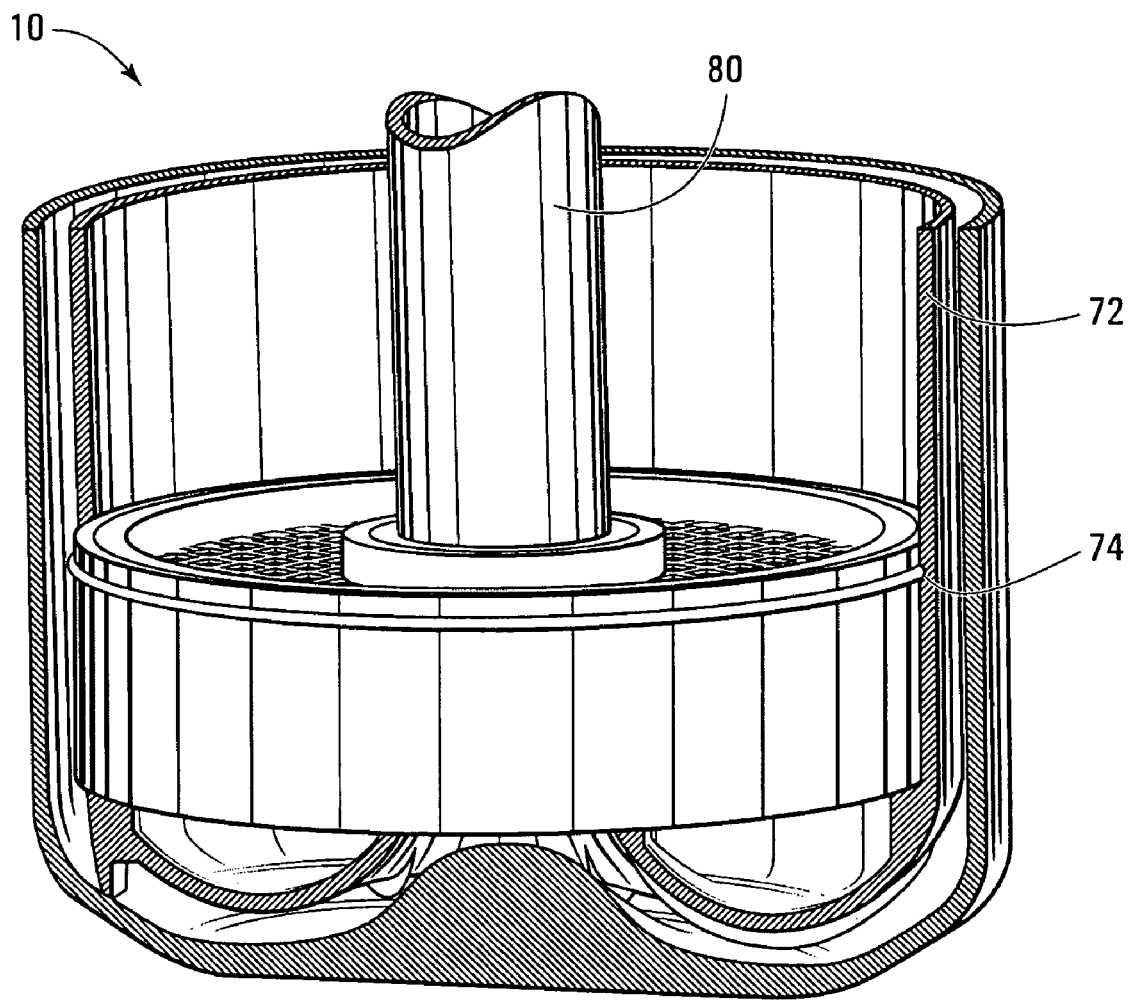
FIG. 3a is a partial cut-away, side view of a portion of the accumulator of FIG. 1.
Figure 3B:
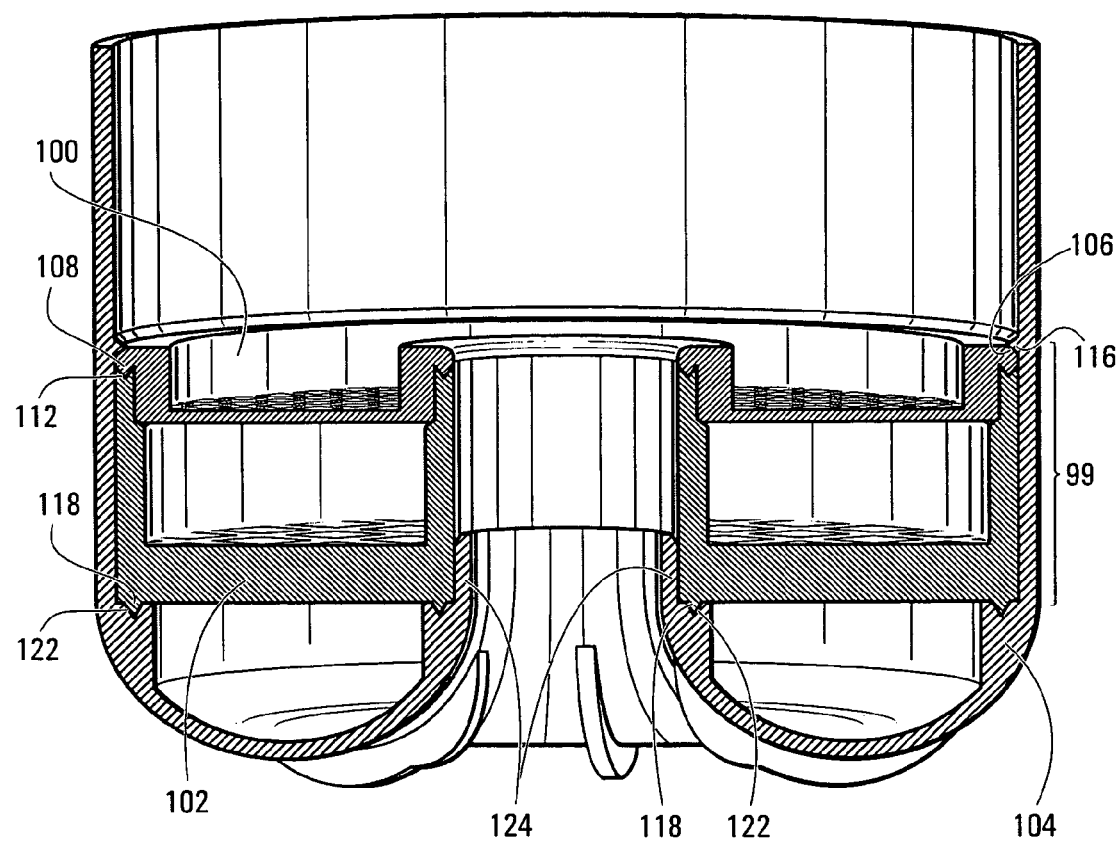
FIG. 3b is cross-sectional view of the desiccant container of FIG. 2f within the accumulator of FIG. 1, taken along line 3b–3b of FIG. 1 (with the outlet tube omitted).

A cross-sectional view of the desiccant container 99 of this alternate embodiment, in place within a liner 104, is shown in FIG. 3b. The lid 100 has an extension portion 106 extending away from a top portion of the lid 100. A v-shaped projection portion 108 projects downwardly from the extension portion 106. To help keep the lid 100 in position on the cup 102, a groove 112 is located along a top surface of the cup 102. After the lid 100 is placed on top of the cup 102, the lid 100 may be ultrasonically welded to the cup 102.

The desiccant container 99 is secured within the liner 104 by sliding the desiccant container 99 past a detent 116, which detent 116 projects inwardly from the liner 104.

As can also been seen from FIG. 3b, lower portions of the cup 102 have downward, v-shaped projections 118, which fit within corresponding v-shaped grooves 122 located within the liner 104.

As shown in FIG. 3b, the liner 104 incorporates a projecting support 124. When the outlet tube 80 (not shown in FIG. 3b) is in place, the outlet 80 rests on top of the projecting support 124.

This alternate embodiment omits a number of elements present in the earlier embodiments described above. For example, the outlet tube stop 60 (as shown in the earlier embodiment of FIG. 2d) and the liner support rib 71 of the inner wall 40 of the cup 14 (as shown in FIG. 2e) have been omitted. As well, the integral bead 36 on the lid 16 of the earlier embodiment of FIG. 2c has been omitted. The groove 56 of the outer wall 42 of the cup as shown in the earlier embodiment of FIG. 2d has been omitted. The bead 62 around the outer wall 42 of the cup 14 (as shown in FIG. 2d) has been omitted. Similarly, the groove 74 on the inside surface of the liner (as shown in FIG. 3a) has been omitted.

As noted above, many other possible embodiments are also within the scope of above teachings. For example, it is possible to design a desiccant container without distinguishable lid and cup portions.

As another example, although the embodiments described above relate to a desiccant container 12 having two integral mesh screens 30 and 46, the desiccant container 12 could contain a single integral mesh screen, either 30 or 46. Instead of the other integral mesh screen, a technique already known by those skilled in the art could be used to provide filtering (such as using a separate filtering device).

Many other modifications and/or variations are also possible. For example, there are many different techniques known to those skilled in the art for fitting parts of containers together and for securing containers within other objects. Therefore, for example, techniques different from those described herein could be used to secure the lid 16 to the cup 14, to achieve a similar result. Various features of the desiccant container 12 have been described as being generally circular (such as the lid 16, the inner boundary 22 of the lid 16, the inner wall 40 of the cup 14, the outer wall 42 of the cup 14, etc.). However, different configurations could also be used. For example, in the embodiment of FIGS. 2b and 2d, the lid 16 has an opening 24 which is centered with respect to the outer boundary 20. Similarly, the opening within the inner wall 40 of the cup 14 is centered with respect to the outer wall 42. However, both the opening 24 of the lid 16 and the opening within the inner wall 40 of the cup 14 could be off center.

The configuration of the desiccant container 12 has been described herein to be adapted to the particular accumulator 10 and liner 72, described above. However, the basic features of the desiccant container 12 could be adapted for other types and configurations of accumulators, with or without liners and for other purposes (outside of the context of air conditioning systems for vehicles). In other words, the embodiments described above relate to air conditioning systems in vehicles. However, the desiccant containers described herein could be used in air conditioning systems outside of the context of vehicles, and could be used outside of the context of air conditioning systems entirely.

What I claim as my invention is:

1. A desiccant container for use in a refrigerant storage device of a vehicle, the container comprising
   a lid comprising an inner boundary defining a first aperture, an outer boundary surrounding the inner boundary, and an integral first mesh screen extending between the inner boundary and the outer boundary, wherein the first mesh screen is adapted to prevent small particles from passing therethrough;
   a body comprising an inner wall defining a second aperture, an outer wall surrounding the inner wall, and an integral second mesh screen extending between the inner wall and the outer wall, wherein the second mesh screen is adapted to prevent small particles from passing therethrough;
wherein the lid and the body are adapted to fit together to create an enclosed cavity, and to prevent small particles from passing between an edge of the lid and the body, and when the lid and the body are together, the first aperture and the second aperture are aligned.

2. The container of claim 1 wherein the first mesh screen comprises an integrally molded support structure.

3. The container of claim 2 wherein the support structure is in the form of a lattice.

4. The container of claim 1 wherein the second mesh screen comprises an integrally molded support structure.

5. The container of claim 4 wherein the support structure of the body is in the form of a lattice.

6. The container of claim 1 wherein an outer surface of the outer boundary of the lid comprises an integrally molded bead, adapted to securely engage an inner surface of the outer wall of the body.

7. The container of claim 6 wherein the inner surface of the outer wall of the body comprises a groove, for secure receipt of the bead of the lid.

8. The container of claim 7 wherein each of the inner surface of the outer wall of the body and the outer surface of the inner wall of the body comprises an integrally molded support rib for supporting the lid in the body.

9. The container of claim 1 wherein an inner surface of the inner wall is adapted to securely engage an outlet 20 tube for the refrigerant storage device.

10. The container of claim 1 wherein the inner surface of the inner wall comprises an integrally molded outlet tube support rib for supporting the outlet tube.

11. The container of claim 10 wherein the inner surface of the inner wall of the body, below the outlet tube support rib, comprises a liner support rib for supporting the body on a liner.

12. The container of claim 11 wherein the outer boundary of the lid is generally circular, the inner boundary of the lid is generally circular, the outer wall of the body is generally cylindrical and the inner wall of the body is generally cylindrical and, when the container is installed within the liner, with the outlet tube installed within the inner wall of the body, the combination of the diameter of the inner wall of the body, the outlet tube support rib and the liner support rib are adapted to prevent particles larger than 350 microns from passing between the body and the outlet tube and to prevent particles larger than 350 microns from passing between the inner wall of the body and the liner.

13. The container of claim 1 wherein the outer surface of the outer wall of the body, near an upper edge of the outer surface, comprises a bead for secure engagement with one of the refrigerant storage device and a liner.

14. The container of claim 13 wherein one of the refrigerant storage device and the liner comprises a groove for secure receipt of the bead of the outer surface of the outer wall of the body.

15. The container of claim 1 wherein the first mesh screen and the second mesh screen are both adapted to prevent particles larger than 300 microns from passing therethrough.

16. The container of claim 1 wherein the lid and the body are adapted to allow the lid to fit securely within the body to prevent particles larger than 350 microns from passing between an edge of the lid and the body.

* * * * *